(12) United States Patent
Artman et al.

(10) Patent No.: US 6,729,753 B2
(45) Date of Patent: May 4, 2004

(54) MIXING DEVICE FOR RECONSTITUTING DEHYDRATED FOOD PARTICLES

(75) Inventors: Richard Artman, Gaylordsville, CT (US); John DeAlessio, New Milford, CT (US)

(73) Assignee: Nestec S.A., Vevey (CH)

( * ) Notice: Subject to any disclaimer, the term of this patent is extended or adjusted under 35 U.S.C. 154(b) by 135 days.

(21) Appl. No.: 10/116,483

(22) Filed: Apr. 3, 2002

(65) Prior Publication Data

US 2003/0189872 A1 Oct. 9, 2003

(51) Int. Cl.$^7$ .............................. B01F 7/04; B01F 15/02
(52) U.S. Cl. .................. 366/164.6; 366/131; 366/196; 366/604
(58) Field of Search ................. 366/131, 194, 366/195, 196, 604, 164.6; 222/129.1, 190

(56) References Cited

U.S. PATENT DOCUMENTS

| | | | | |
|---|---|---|---|---|
| 1,885,416 A | * | 11/1932 | Connelly | 366/194 |
| 2,510,955 A | * | 6/1950 | Brown | 366/194 |
| 2,653,801 A | * | 9/1953 | Fontein et al. | 366/165.1 |
| 2,688,470 A | * | 9/1954 | Marco | 366/155.2 |
| 2,919,726 A | * | 1/1960 | Zimmermann et al. | 222/190 |
| 3,012,763 A | * | 12/1961 | Martin | 366/279 |
| 3,018,091 A | * | 1/1962 | Duggins | 366/194 |
| 3,140,861 A | * | 7/1964 | Krup | 366/196 |
| 3,168,292 A | * | 2/1965 | Joschko | 366/279 |
| 3,249,554 A | * | 5/1966 | Diamant et al. | 366/604 |
| 3,266,670 A | * | 8/1966 | Brooks et al. | 222/54 |
| 3,268,212 A | * | 8/1966 | Ziselberger | 366/604 |
| 3,341,468 A | * | 9/1967 | Rosen | 366/604 |
| 3,382,897 A | * | 5/1968 | Skiera et al. | 141/107 |
| 3,423,075 A | * | 1/1969 | Knudsen et al. | 366/196 |
| 3,529,749 A | * | 9/1970 | Lehmann et al. | 222/129.1 |
| 3,671,020 A | * | 6/1972 | Krup | 366/307 |
| 3,946,995 A | * | 3/1976 | Anderson | 366/307 |
| 4,089,050 A | * | 5/1978 | Huet | 366/164.6 |
| 4,134,332 A | | 1/1979 | Merman | 99/289 |
| 4,172,669 A | * | 10/1979 | Edelbach | 366/181.1 |
| 4,185,927 A | * | 1/1980 | Uttech | 366/131 |
| 4,194,843 A | * | 3/1980 | Martin | 366/138 |
| 4,208,134 A | * | 6/1980 | Whittle | 366/196 |
| 4,357,861 A | * | 11/1982 | Di Girolamo | 366/196 |
| 4,421,413 A | * | 12/1983 | Sekiguchi | 366/307 |
| 4,478,357 A | * | 10/1984 | Jenkins | 222/129.1 |
| 4,676,401 A | * | 6/1987 | Fox et al. | 222/190 |
| 4,915,509 A | * | 4/1990 | Sauer et al. | 366/196 |
| 5,575,405 A | * | 11/1996 | Stratton et al. | 222/129.1 |
| 5,927,553 A | * | 7/1999 | Ford | 222/129.4 |

FOREIGN PATENT DOCUMENTS

| | | |
|---|---|---|
| DE | 12 26 814 B | 10/1966 |
| EP | 0 009 270 | 4/1980 |

* cited by examiner

Primary Examiner—Tony G. Soohoo
(74) Attorney, Agent, or Firm—Winston & Strawn LLP

(57) ABSTRACT

The present invention relates to a mixing device particularly adapted for mixing and delivering a mixture of food product containing large particulates from dehydrated material and a diluent. This device includes a mixing chamber including a propeller, at least one inlet for the dehydrated and diluent to enter the mixing chamber, and an outlet for the mixture to exit the mixing chamber. The propeller is arranged about a rotation axis to provide centrifugal forces upon rotating to create a pumping action in the mixing chamber. Also, the propeller describes a limit plane of rotation demarcating a centrifugal part and a suction part. The outlet has a cross section with an axial dimension of at least 12.5 mm and is positioned in the mixing chamber relative to the propeller so that at least 50% of the outlet surface area is located in the centrifugal part of the chamber.

20 Claims, 6 Drawing Sheets

MIXING DEVICE FOR RECONSTITUTING DEHYDRATED FOOD PARTICLES

FIELD OF THE INVENTION

The present invention relates to a device adapted for mixing and delivering food especially food containing large particulates obtained from a mixture of dehydrated material and a diluent such as water and the like, and to a method for providing a hydrated foods that are prepared from such large particulate dehydrated materials.

BACKGROUND OF THE INVENTION

Dehydrated foods are often prepared in dispensing machines by mixing a metered amount of dehydrated material with a metered amount of water or other diluent in appropriate ratio to obtain a proper reconstitution that makes the final food palatable and as close as possible to the appearance and texture of homemade food, while also being dispenses at the desired serving temperature. The preparation of food in a dispensing device by mixing such a powdered food component with a diluent is practical, speedier and saves labor and catering space in foodservice areas such as in restaurant, fast foods, offices, convenient stores, other public or private work or commercial places, sport arenas, or other places.

Food products, in particular culinary products, that are provided by automatic dispensing systems suffer from several drawbacks. They are sometimes viewed as having relatively poor quality, appearance and/or taste.

There is actually an increasing consumer interest for on-demand food of improved texture, in particular for culinary products such as soup, potage or more solid food such as mashed vegetables and the like. One way for improving the quality is by adding discrete non-dispersible or non-soluble particulates in the dehydrated powder, therefore increasing the consumer's acceptance for these types of food.

Attempts have been made to employ traditional hot beverage dispensers for reconstituting and dispensing culinary food from dehydrated material such as soup, mashed potatoes and the like. However, those machines of the prior art are not well fitted to properly deliver products of desired texture and quality from dehydrated materials that contain large particulates without risking clogging of the equipment after a limited number of dispensing cycles.

Furthermore, the powder used for making beverages in beverage dispensers, for example, is usually powder that is agglomerated. Once partly moisturized, agglomerated powder is known in the art to more freely flow than a non-agglomerated powder. However, agglomerated powder is also more costly than non-agglomerated powder as an additional step is required during the processing of the powder. Therefore, it is more expensive to use agglomerated material for reconstitution of food preparations, especially for culinary preparations. While agglomeration of powder improves powder flow, it does not necessarily prevent the device from clogging when large particulates are to be delivered.

In fact, traditional machines have proved to be completely inappropriate to deliver food preparations containing large non-dispersible or non-soluble particulates. After being hydrated, these particulates can end up with a size of up to 15–20 mm, and the machines can clog after a few cycles only. Clogging is due essentially to the formation of pieces that are larger than the discharge outlet of the mixing chamber, or due to two or more particles of equal or lesser size than the discharge outlet of the mixing chamber trying to exit the chamber simultaneously. In addition, the mixing devices of the prior art have a tendency to damage the particulates by breaking or cutting them to a smaller size that is unacceptable for preparing the desired food products. The resulting food preparation has poor texture with particulates of reduced size and it does not provide the added value that is expected by the consumer.

U.S. Pat. No. 4,185,927 discloses an apparatus for quickly mixing a liquid with a dry particulate food or beverage material, especially mashed potato mix with hot water, to produce a palatable serving of mashed potatoes. In this mixing machine, a centrifugally agitator rotates on a horizontal axis. The food product enters the mixing chamber in substantially horizontal flow through an inlet port of an end wall and the mixture leaves the chamber in substantially horizontal flow through an outlet port wholly spaced below the inlet port and extending down to the level of the bottom of the chamber. Centrifugal action maintains a pressure difference between the ports that assures fast movement of materials through the mixing chamber to prevent plugging of the machine by the mashed potato mix. However, this device is not designed for dispensing dehydrated material containing large particulates.

Therefore, there is a need for a mixing and delivering device capable of undertaking the preparation from dehydrated food material which contains particulates of desired size, and preferably of larger sizes, to repeatedly make, without clogging the device, final food preparations of richer, better quality and texture. The present invention now satisfies this need.

SUMMARY OF THE INVENTION

The invention relates to a mixing device of high versatility as it is able to very effectively mix and deliver food of various types from dehydrated material for serving in a cup or other container at the desired texture. The invention is particularly useful for mixing and delivering food preparations from dehydrated material containing large particulates, such as pieces of vegetable, meat, fish, seed, fruit and the like, while preserving at best the integrity of the particulates and delivering a particulate product of a higher organoleptic and nutritional value into the serving container.

In a preferred embodiment of the device, there is provided a mixing chamber for receiving at least one dehydrated component and at least one hydrating component. The dehydrated component may preferably include large particulates. At least one inlet is provided in the chamber for the dehydrated component and hydrating component to enter the chamber. The inlet may be common to the at least two components or separate inlets may separately deliver the components. An outlet is provided in the chamber that allows the mixture of the at least two components to exit the chamber. A propelling means, later called "propeller" herein, is arranged in the mixing chamber to provide centrifugal forces in a main centrifugal direction. In particular, the propeller is configured in rotation about an axis of rotation to mix and propel the combination of components. The propeller is also positioned in the mixing chamber to provide a pumping action in the mixing chamber as a result of the centrifugal effect. The propeller has a limit plane of rotation corresponding to the rearmost limit in the mixing chamber where the material is submitted to the centrifugal effect. The limit plane of rotation substantially demarcates a suction part on one side and a centrifugal part of the mixing chamber on the other side of the limit plane. Therefore, all material passing forward the limit of the limit plane undergoes centrifugal forces by the propeller in the centrifugal part.

According to an essential aspect of the invention, the outlet is enlarged in its axial dimension as compared to the existing mixing device to be of at least 12.5 mm, preferably at least 15 mm. Importantly, the outlet remains positioned in the mixing chamber relative to the propeller so that at least 50% of its surface area, more preferably 65% and even more preferably 80%, is located in the centrifugal part forward of the rear rotational plane.

As a result, such an enlargement of the outlet shows a vast improvement in the dispensing of the dehydrated component with large particulates without risks clogging whereas the outlet relative position ensures that an optimal mixing action is still maintained. Therefore, in addition to the benefit of promoting the flow of large particulates by the elongated configuration of the outlet, the pumping action is sufficiently effective to provide a satisfactory level of mixing and hydration. In particular, there is no significant amount of material passing all the way through the mixing chamber to exit the outlet without having been submitted to the centrifugal force of the propeller beforehand.

It has also been found that the definition of the outlet above provides the proper residence time for the product to remain in the chamber. In other words, the product remains in the chamber long enough to allow proper dissolving and mixing, but also short enough that air does not become entrained in the mix and particulates do not get destroyed.

In a preferred embodiment, the outlet has a cross section that is elongated and oriented so that its longer axial dimension is substantially parallel to the rotational limit plane of the propeller and positioned forward this rotational plane. The elongated configuration of the outlet promotes, at the same time, a proper passage adapted for large particulates and an appropriate relative position of the outlet to ensure an effective pumping action.

In an even preferred embodiment, the outlet is positioned so that its is wholly placed forward the rotational limit plane of the propeller. As a result, it ensures that all material in transit in the mixing chamber is centrifuged by the propeller and that there is no area of the outlet capable of receiving material coming directly from an area of the chamber located upstream of the propeller.

In the preferred embodiment, the axial dimension of the outlet, or "length" of the outlet, is at least equal to 0.5 times, preferably 0.75 times the size of the diameter of the circular path of the propeller. Even more preferably, the axial dimension of the outlet is at least the same size of the diameter of the circular path of the propeller. Similarly, the transverse dimension or "width" of the outlet is at least equal to 0.5 times, preferably 0.75 times the size of the projected width of the propeller. Even more preferably, the transverse dimension of the outlet is at least the same size as that of the projected width of the propeller.

The invention also relates to a method and delivering a rehydrated mixture of dehydrated food material containing particulates and a diluent. This method comprises providing dehydrated food material and a diluent in a mixing zone, providing a centrifugal mixing force to form a rehydrated mixture in the mixing zone, and delivering the rehydrated mixture through a dispensing outlet having a cross section that has an axial dimension of at least 12.5 mm by a pumping action created as a result of the centrifugal force exerted in the mixing zone so that the rehydrated mixture does not clog the mixing zone or the dispensing outlet.

Preferably, the outlet is positioned in the mixing zone relative to the propeller so that at least 50% of the outlet surface area, more preferably 65% and even more preferably 80%, is located in the centrifugal part in front (i.e., forward) of the limit plane of rotation of the propeller.

According to one advantageous aspect of the invention, the method provides a delivery of particulates of a size larger than 5 mm, even preferably larger than 10 mm, without clogging and without significant reduction of the particulates size. In particular, the method enables to deliver a rehydrated mixture from dehydrated material containing at least 5 wt. % of large particulates, even more preferably at least 8 wt. %.

The invention also relates to a dispensing device comprising means for storing a supply of a dehydrated component, means for dosing the dehydrated component from the supply, means for providing a diluent from a diluent source, a serving area, and one of the mixing devices disclosed herein.

DETAILED DESCRIPTION OF THE PREFERRED EMBODIMENTS

Figure 1:
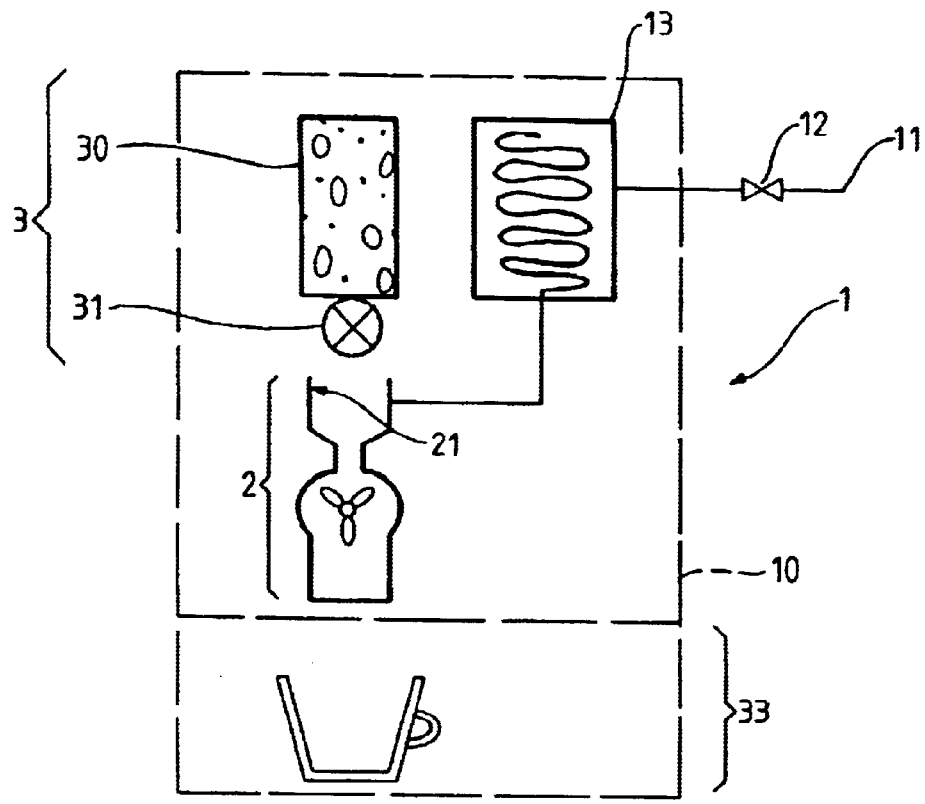
FIG. 1 is a general schematic view of a dispensing device that comprises a mixing device of the invention.
Figure 2:
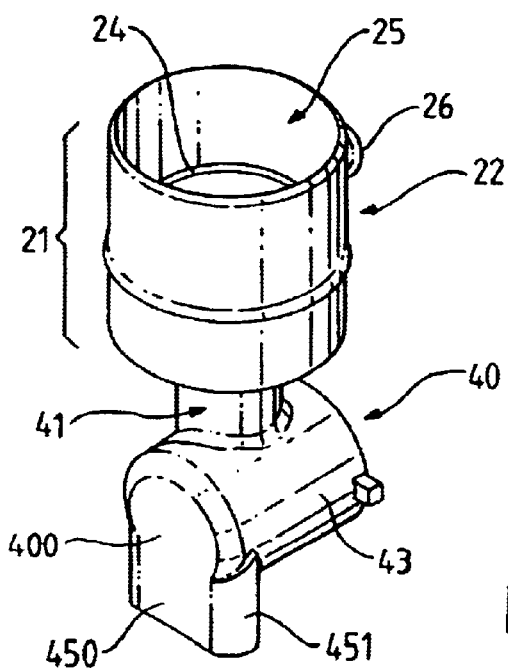
FIG. 2 is a perspective view of a preferred embodiment of the mixing device of the invention.

Referring to FIG. 1, it is shown an exemplary dispensing device 1 of the invention. The dispensing device may include a housing which encloses components adapted to prepare a hot, warm or cold food product from dehydrated materials. It is apparent that the device bears a general resemblance to commercially available machines for dispensing beverages or culinary food products. However, the device of FIG. 1 is quite different from known devices by the mixing and delivering assembly 2 that is mounted in the device. The dispensing device 1 may further comprise a source of diluent such as water that comes from tap water supply 11 which may be controlled by a valve 12. A boiler 13 is located further downstream of the water supply line inside the housing to deliver hot water to the mixing assembly 2. Suitable control means and thermostats are provided to deliver and cycle water in desired amounts and at a desired temperature in the mixing device.

The device further includes a dosing reservoir 3 containing the food component. The food component to be mixed with the diluent, is preferably a dehydrated food component. The food component is stored in a hopper which is a reservoir 30 of sufficient capacity to repeatedly deliver portions of dehydrated food component. A dosing mechanism 31 is provided below the reservoir 30 which is in general a volumetric dosing screw or auger in a barrel.

The hopper may be fed with dehydrated material such as powder, granules, flakes, etc., for the preparation of food of variable viscosity and texture such as mashed vegetable, soup, potage, sauce, porridge, polenta and beverages. The dehydrated material may also advantageously contain large dried particulates to form a final coarse mass upon proper reconstitution with the diluent. The particulates may take any suitable forms of any desired food material. They may be dried pieces, slices or fibers of meat, fish, vegetable, fruit, grain, seeds, etc.

The dried particulates may have an individual size of between 2 to 30 mm, preferably 5 to 25 mm. The relative concentration of particulates in the finer dehydrated mass is not limited and, for example, may range from 0.1% to 99.9%, preferably 2% to 30% by weight. A typical example of a preparation that provides a value-added meal may be mashed potatoes with meat balls. The mashed potatoes are obtained from dehydrated granules of an average size of 0.25 to 2 mm to which is added dehydrated meat balls of a size between 5 to 10 mm. Another example of a richer food preparation that can be dispensed without any more problems is a coarse particulate soup containing at least 8 wt. % solids and more than 3 wt. % of dried particulates of an average size of greater than 5 mm.

Upon electrical actuation of the dosing member, metered portions of the dehydrated food component fall by gravity into a funnel-like member 21 of the mixing device that collects them with a metered amount of a diluent also coming preferably from a side of the member 21. A desired dilution ratio is obtained by properly proportioning the dehydrated component and the diluent and mixing them together in the mixing device.

Of course, the dispensing device may comprise as many as food dosing reservoirs 3 and mixing devices 2 as necessary. These elements may be independently placed to deliver separate food preparations or, alternatively, may be grouped where several food components are combined and mixed from separate hoppers in a single mixing device.

Below the mixing device 2 is located a serving area 33 adapted to receive a cup or any similar serving container. Once properly mixed in the mixing device 2 the components discharge from the mixing chamber by the combined effect of gravity and the centrifugal force exerted in the mixing chamber to deliver the preparation as it will be explained later.

A first preferred embodiment of the mixing device invention is shown in more detail in reference to FIGS. 2 to 5.

The preferred mixing device 2 of the invention has an input container such as, for example, a funnel-like member 21 with an upper enlarged portion 22 adapted to receive the dehydrated and fluid diluent components and a restriction portion 23 for channeling the combination of components in a mixing chamber 40 located below the member 21. In the enlarged bowl portion is provided a tangential inlet 28 for feeding the fluid diluent under pressure. An automatically controlled valve is preferably provided to control the diluent flow into the input container. The diluent is preferably introduced through the inlet at a speed selected to produce a swirling, whirlpool effect.

A dehydrated component to be mixed with the diluent is fed into the powder inlet 25. A lip 24 extends around the interior of the funnel-like member at the powder inlet 25. The lip protrudes into the enlarged portion 22 to prevent swirling fluid from exiting the input container by the upper side thereof. A suction is applied to orifice 26, connected to the underside of the lip 24 for extracting any moisture vapor. The powder inlet is sufficiently large to receive the dehydrated component poured therein.

In the embodiment shown, the restriction portion 23 extends downward by an internal throat portion 27 of the input container that is disposed below the restriction portion 23. The throat portion 27 has a narrower diameter than the bowl portion 22 and is coaxially disposed with respect to the bowl and restriction portions 22, 23. The funnel-like member 21 may be made of two or more molded plastic pieces assembled together as shown in the figures or, alternatively, be made of a single piece obtained by injection.

Figure 6:
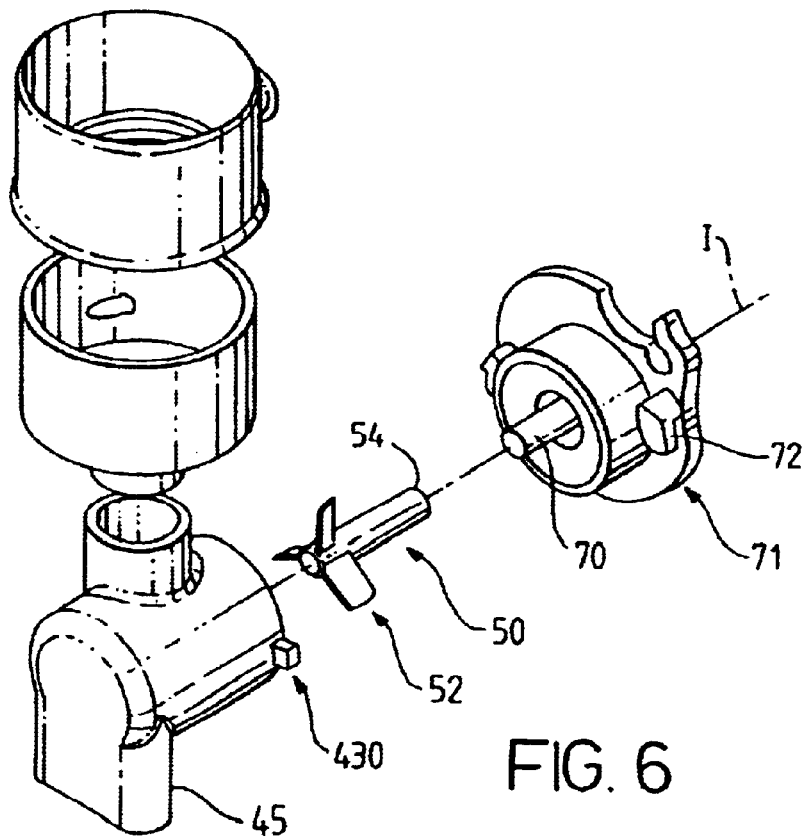
FIG. 6 is an exploded view of FIG. 2.

The funnel-like member 21 connects to a mixing chamber 40 by its internal throat portion 27 fitting a neck portion 41 of the mixing chamber protruding upwardly. At the connection area is thus formed the mixing inlet 42 of the mixing chamber 40. The mixing inlet 42 communicates to the mixing chamber that has a cylindrical body portion 43. A propelling assembly 50 is provided within the mixing chamber with a rotor shaft 51 and a propelling member 52 comprising a plurality of blades connected to a first end 53 of the rotor shaft 51. As shown in FIG. 6, the second end 54 of the rotor portion is connected to a motor shaft 70. The motor shaft 70 drives the rotor shaft 51 at about the rotational axis I. The propelling assembly is arranged so that it is substantially coaxially oriented with the longitudinal axis of the cylindrical body portion 43 of the chamber. A motor controller is preferably provided to control the operation and speed of the motor. The cylindrical body of the mixing chamber is closed at rear by a disk-shaped support member 71 snug fitting the internal surface of the mixing chamber. A quick-release/attach mechanism is preferably provided and, in the embodiment shown, includes retaining members 430 of the body that cooperate in sliding motion with cam-type receiving members 72 mounted at the periphery of the disk-shaped support member 71 to form together a bayonet locking mechanism. Other quick release mechanism are suitable for embodiments of the invention, such as other latching mechanisms in which latches move along a differently shaped path, and in which the latches are received in receptacles.

Figure 7:
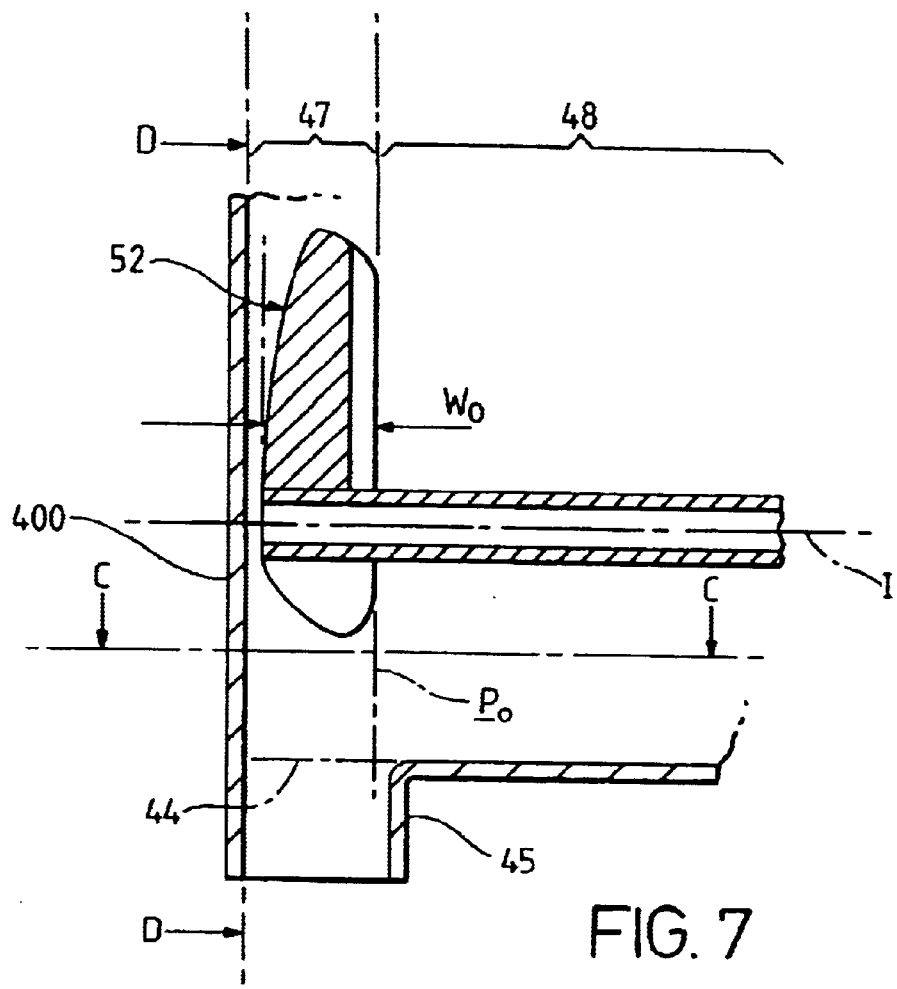
FIG. 7 is an enlarged cross sectional partial view along line A—A.

The propeller 52 of the propelling assembly has preferably vanes or blades that rotates along longitudinal axis I. As best shown in FIG. 7, upon rotating, the propeller 52 defines a rear or limit plane of rotation $P_0$ that lies substantially orthogonal to the rotation axis I. The rear plane $P_0$ is regarded as a plane orthogonal to axis I and passing through the rearmost point(s) of the blades. The plane $P_0$ does not necessarily refer to a physical rear planar surface of the propeller since the propeller has no cylindrical homogeneous rear surface from its center point to the extremities of the blades but most likely to a few points mobile in rotation that define a plane. When the propeller 52 is rotated at a mixing speed, a centrifugal force imparted to the food material contacting the blades or vanes is generated that is substantially oriented along the rotational plane $P_0$. In fact, this plane represents the limit of the blade at rear of the mixing chamber that contacts the food material in the mixing chamber. Therefore, in front centrifugal part 47 of the mixing chamber is created centrifugal forces that impart motion and thorough mixing to the material whereas in rear part of the mixing chamber is the suction part 48 where a depression is created to draw material from the inlet by virtue of the overpressure created in the front part 47.

Figure 8:
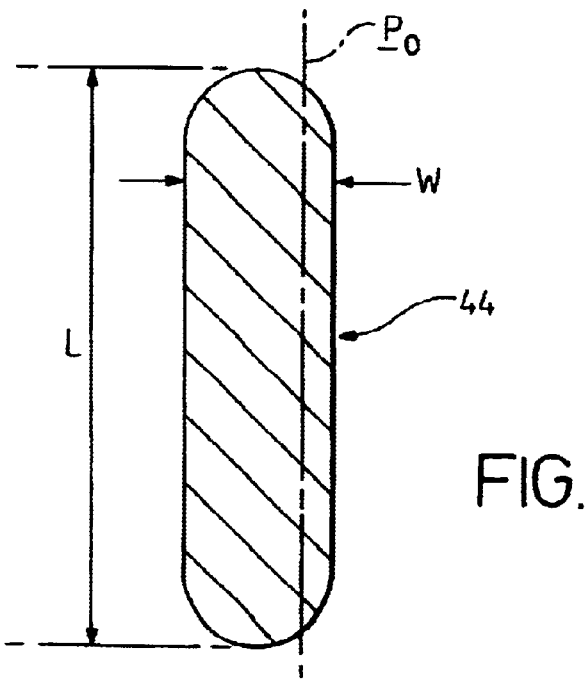
FIG. 8 is a schematic partial view taken along line C—C of FIG. 7.

According to one important aspect of the invention, the mixing chamber is provided with an outlet 44 that has preferably a cross section which has an elongated shape. As more clearly shown in FIG. 8, the outlet 44 for the material to exit the mixing chamber is preferably positioned so that at least 50% of the surface area of the outlet is situated in front of the rear rotational plane of the propeller 52. Preferably, at least 65% of the surface area is situated in front of this plane and even preferably at least 90%. The cross section of the outlet comprises an axial dimension L corresponding to the "longer length" and a transverse dimension W corresponding to the "width" of the outlet as illustrated in FIG. 8. The cross section of the outlet is so oriented with respect to the rear rotational plane of the propeller so that its longer dimension L is substantially parallel to the rear plane $P_0$. As a main result of the shape and location of the outlet of the mixing chamber, it is made possible to deliver large particulates while taking advantage of an effective pumping action all through the mixing chamber thereby a good and thorough mixing can be maintained. In another embodiment, it would also be possible to have the axial line of the outlet be slightly inclined relative to the plane $P_0$ although that would make the front part of the mixing chamber more cumbersome and more difficult to dispose if a compact dispensing housing is required. In a preferred embodiment, the inlet is positioned substantially rearward or behind the rear rotational plane or limit plane of the propeller.

More particularly, the inlet 42 of the chamber is positioned in the suction portion 48 of the mixing chamber where a depression is created by the propelling action. Therefore, the mixing chamber and the propeller are arranged so as to work as a pump. As a result of having the inlet in that zone, the material is displaced from this portion to the centrifuging portion 47 in a more direct manner and the residence time is more accurately controlled with less material being stuck or recycled in the mixing chamber for an exaggerated period of time.

Figure 5:
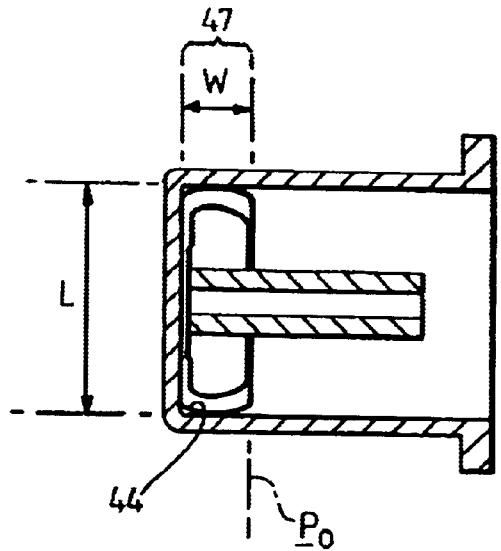
FIG. 5 is a cross sectional view along B—B of FIG. 4.

In an embodiment as shown in FIG. 5, the outlet may be wholly maintained forward or in front of the rear plane $P_0$. In other words, the outlet is so entirely circumscribed within the front part 47 of the mixing chamber that corresponds to the part where the centrifugal force is applied by the propeller.

The longer dimension L of the outlet should be sufficient to allow particulates of large size to pass therethrough without clogging. The longer dimension L may vary depending of the particulates to dispensed. However, the longer dimension of the outlet should preferably be of at least 50%, preferably at least 75%, even more preferably at least 85%, the particulate maximal length to be dispensed.

Figure 9:
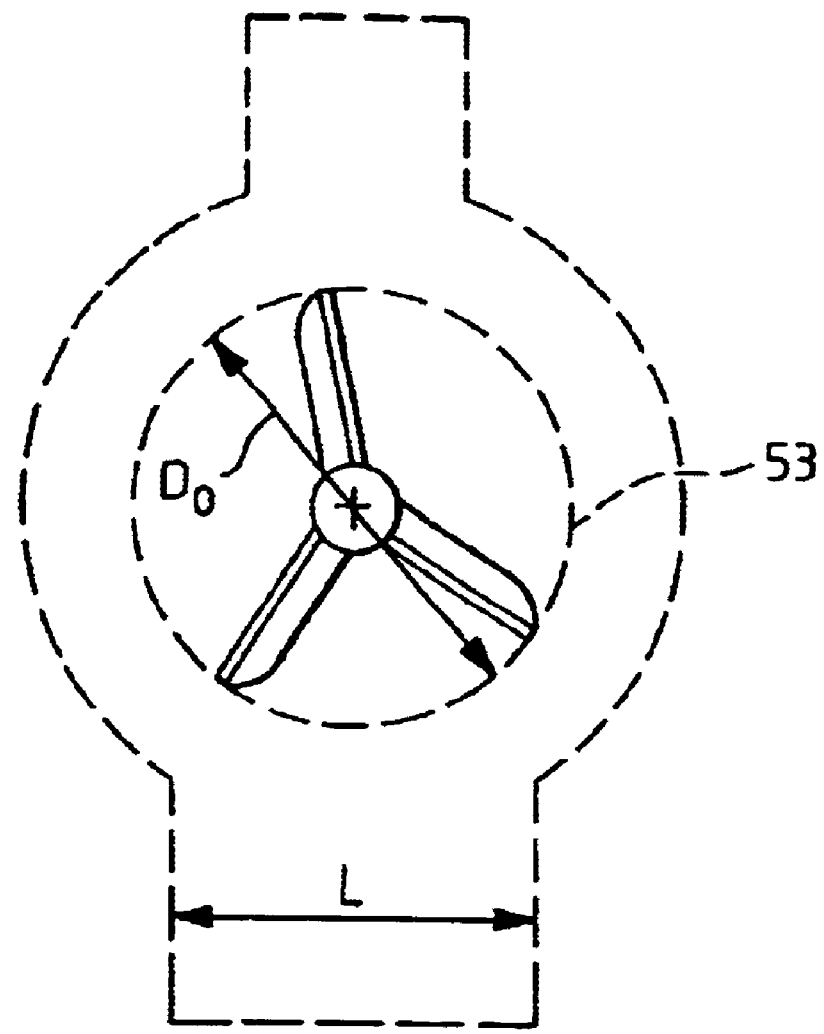
FIG. 9 is a schematic partial view taken along line D—D of FIG. 7.

The longer dimension L of the outlet may also preferably be at least one-half the size of the diameter of the circular path of the propeller. By "diameter of the circular path", it is meant the diameter $D_0$ that is measured along the more external line 53 described by the extremities of the blades of the propelling portion as shown in FIG. 9. In a similar manner, the width of the outlet section should also be such that it is at least one-half the size of the width $w_0$ as measured in the area of maximal width band described by the blades of the propeller of the propeller as illustrated in FIG. 7.

The preferred axial dimension of the section of the outlet 44 is of at least 15 mm, preferably at least 18 mm, even more preferably at least 20 mm. The preferred transverse dimension of the section of the outlet is at least 10 mm, preferably of at least 13 mm, even more preferably at least 15 mm. The preferred ratio of the axial dimension to transverse dimension of the outlet and a ratio axial dimension to transverse dimension is comprised between 1:1 to 3:1, even preferably comprised between 1.5:1 to 2.5:1.

The cross section of the outlet 44 can take any suitable elongated shape. In the preferred embodiment illustrated in the figures, the cross section of the outlet has an oval shape with two central straight edges and two rounded end edges. In an alternative, the cross section of the outlet has a rectangular, a crescent or half-moon shape. The elongated shape is the preferred configuration but symmetrical shapes may be envisaged such as square, round or polygonal provided such shapes are properly oversized and are positioned correctly in the mixing chamber for the intended benefits.

The propeller may also take various configurations and shapes. In a preferred embodiment, the propeller has flat elongated vanes or blades distributed at the periphery of the rotor axle of the propeller. The number of vanes or blades may vary from 2 to 10, preferably 2 to 5, even more preferably it has three or four blades evenly distributed about the rotor axle.

A further shown in the first embodiment of FIGS. 2–6, the cross section of the outlet is oriented relative to the rotation axis I of the propelling assembly to form an angle that is about zero degrees. Thus, the outlet can extend through a portion of duct 45 that is oriented downward and directed straight to the area of the cup. As the maximum centrifugal force is essentially created substantially in the rotational band described by propeller, the outlet is positioned in line with the direction of this centrifugal force therefore minimizing the residence time of the particulates in the mixing chamber and reducing the breaking effect on the particulates of large size that may occur between the propeller and the walls of the mixing chamber. This is also the configuration where clogging is minimized in the mixing chamber as this is the more direct line for the centrifuged material to exit the mixing chamber. The portion of duct is used to guide the mixed preparation to the cup and therefore may be of varying length depending on the distance that separates the bottom of the mixing chamber to the serving area.

Figure 3:
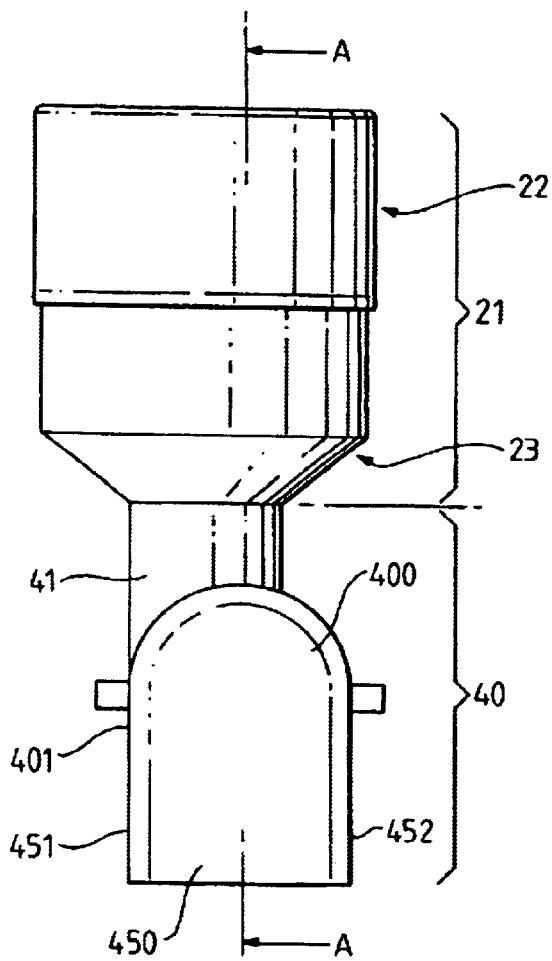
FIG. 3 is a front view of FIG. 2.
Figure 4:
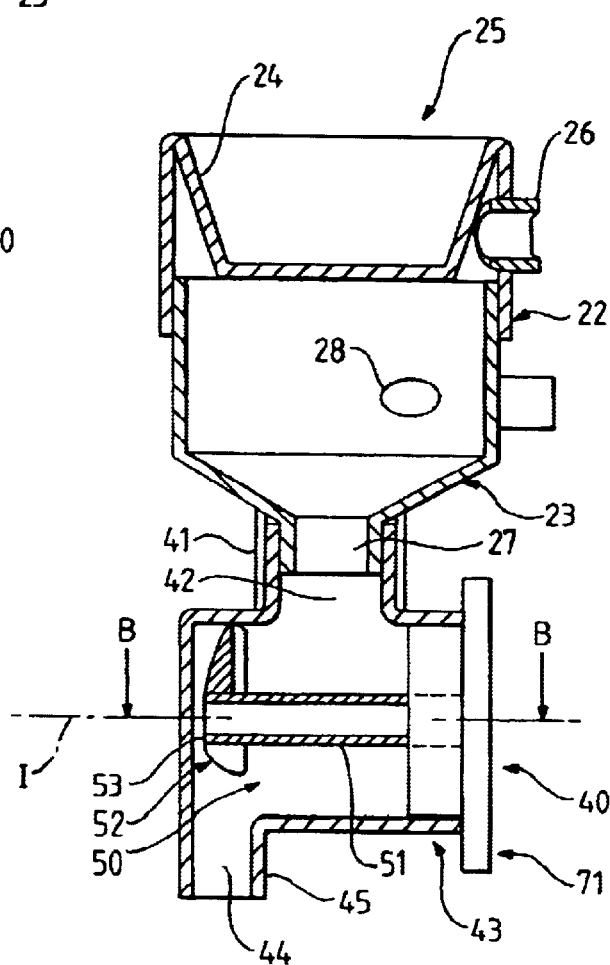
FIG. 4 is a cross sectional view along line A—A of FIG. 3.

In the first preferred embodiment, the duct portion 45 connects to a substantially cylindrical wall of the mixing chamber with no substantial zone of restriction between the cylindrical wall of the mixing chamber and the peripheral wall of the duct portion. Preferably, the duct portion has a front peripheral wall 450 that comes flush with the front wall 400 of the mixing chamber. Similarly, as shown in FIG. 3, the side walls 451, 452 of the duct portion past the outlet comes substantially flush to the peripheral wall 401 of the mixing chamber. Of course, the mixing chamber may have other shapes than cylindrical while still connecting substantially with the duct portion with no substantial zones of restrictions that could prevent material from settling, forming bridges or zones of accumulation that would block the machine and/or affect the accuracy in solid concentration of the delivered preparation. The term "zone of restrictions" as used herein, means any portion that would abruptly restrict the section in the transitional portion between the mixing chamber and the duct portion.

Figure 10:
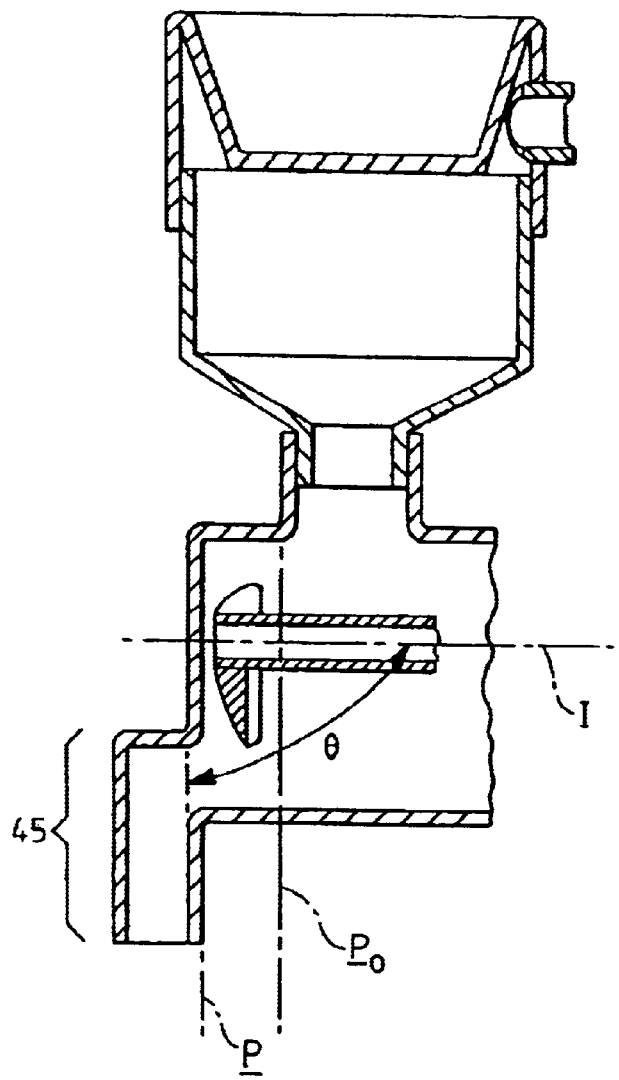
FIG. 10 is a section view similar to FIG. 4 of another embodiment of the invention.
Figure 11:
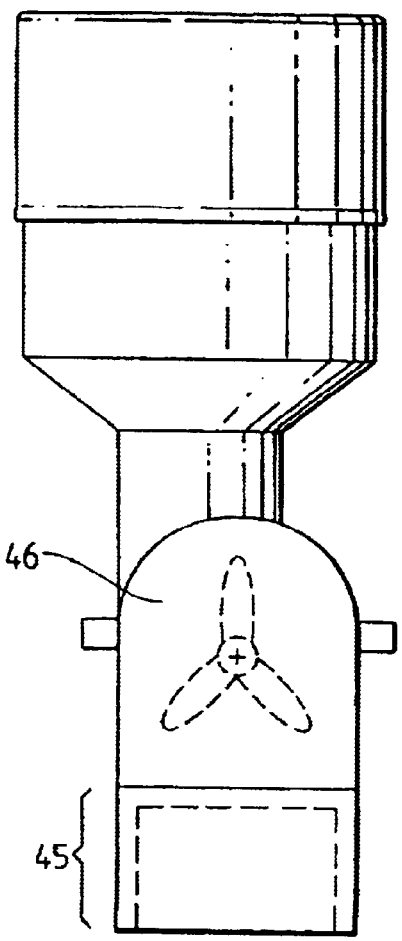
FIG. 11 is a front view similar to FIG. 5 of the embodiment of FIG. 10.

In a possible embodiment illustrated in FIGS. 10 and 11, the cross section of the outlet is oriented with respect to the axis of rotation I of the propeller at an angle θ of about 90 degrees and extends from the mixing chamber by a duct portion 45 and is curved downwardly and connects to the bottom of the front wall 46 of the mixing chamber. Theoretically, this elongated configuration of the outlet also promotes the exit of the particulates through the outlet but it is a less preferred embodiment as the outlet is not directly oriented in the centrifugal direction.

Any configuration of the cross section of the outlet positioned between zero to 90 degrees relative to the rotation axis of the propeller may be envisaged as possible embodiments without departing from the scope of the present invention.

To prepare a solid or liquid food preparation according to the invention, a user is usually making a choice on a switch board of the dispensing device. According to this choice, a controlling system controls the metered delivery of the dehydrated component and diluent component in respecting a programmed dilution ratio. In the preferred embodiment, the diluent comprises water, and the flow rate is about between 3 to 12 mL/sec, more preferably 5 to 10 mL/sec. At the time or preferably after the water flow into the input container is commenced, a(t least one) dehydrated component is dosed into the water through the funnel-like member 21. Preferably, the dehydrated component dosing begins at least about 0.1 sec after the water dosing begins. Preferably, the water is continued to be fed into the funnel-like member until the powder dosing is stopped to rinse the interior surface of the funnel-like member. The propeller is activated shortly before or simultaneous to the components being dispensed. The preferred rotor speed for preparing a particulate food preparation according to the invention may vary of from 1 000 to 15 000 rpm, preferably of from 6 000 to 13 000 rpm. However, the speed may be adjusted depending on many different factors including the type of dehydrated material, size of the particulates, geometry of the mixing chamber, dilution ratio, requirement for foam or no foam in the cup, etc. The propeller activation is maintain as long as there is material in the mixing chamber. The combination of the centrifugal effect and gravity forces the mixture through the mixing chamber and is dispensed in a serving container.

It is understood that the term "dehydrated material" as used herein means any sort of food material in which a portion of moisture has been removed and which requires mixing with a diluent to reconstitute a food preparation. Therefore, the term includes dry food material such as powder, granules, flakes, etc. but also partially dehydrated food material such as concentrates or pastes.

It is understood that the term "particulates" as used herein means materials that are large enough that they are perceivable, discernable and/or recognizable to the typical consumer.

It is understood that the term "food" as used herein means any sort of edible preparations including solid food, semi-solid food, liquid food, sauce, seasonings and beverages.

It is also understood the term "diluent" means any sort of fluid material which has the ability to dilute, dissolve, disperse or wet food solid at any suitable temperature such as water, milk, intermediate beverage or culinary solution or any other at least partially aqueous solution.

The term "propelling assembly" or "propeller" used herein, it is meant any suitable mechanism adapted to produce a centrifugal force upon rotation such a whipping assembly or whipper or any other equivalent device.

The terms "front" and "rear", "forward" and "rearward" are used herein to define the relative spatial positioning of means and/or geometric references in the mixing chamber but should not be construed restrictively to a rigid spatial configuration with respect to its surroundings but, on the contrary, encompass other relative positioning such as "first" and "second" or "top" and "bottom" whenever the mixing device is taken as a whole in other spatial configurations.

Where the term "substantially" is used, that term is generally defined to mean at least about 95% of the value referred to, to preferably at least about 100% of the value referred to.

EXAMPLES

The following non-limiting examples are provided to illustrate the preferred features of the invention.

Example 1

A dehydrated cream of vegetable soup mix consisting of flour, dried vegetables (carrot, mushrooms, onion, dried potato, red bell pepper, corn, green beans, peas leeks, cabbage, and celery), salt, partially hydrogenated vegetable oil, modified corn starch, monosodium glutamate, sugar, sodium caseinate, flavorings, lactose, parsley flakes, potassium phosphate, spices, corn syrup solids, disodium inosinate/guanylate, brown rice syrup, corn starch, sunflower oil, turmeric and sodium sulfate was reconstituted by mixing with water using a mixing system typically found in a dispenser for this purpose. The particle size distribution of the soup mix consisted of 84.7% with a particle size less than 4.75 mm, and 15.3% with a particle size of greater than 4.75 mm (mainly the dried vegetables). The soup mix was reconstituted to a solid level of 10% using water that was 85° C. Narrow-type whippers (blade width 8 mm) and wide-type whippers (blade width 15.9 mm) were used at a whipper speed of 7800 rpm. The soup was mixed using a standard whipping chamber with a 11.2 mm diameter round discharge hole or a whipping chamber of the invention with an oval discharge hole with a width of 15.9 mm and length of 26.7 mm. The soup was reconstituted until the discharge hole of the mixing chamber clogged and overflowed.

| Whipper Type | Chamber Type | Number of servings until clogging |
| --- | --- | --- |
| Narrow width | Circular hole of 11.2 mm diameter (Standard) | 2 |
|  | Oval hole of 26.7 by 15.9 mm (Invention) | No clogs after 40 servings |
| Wide width | Standard | 1 |
|  | Invention | No clogs after 40 servings |

Example 2

The same cream of vegetable soup mix as in Example 1 was used except that the amount of dried vegetables was increased such that the particle-size distribution consisted of 79.9% with a particle size less than 4.75 mm, and 20.1% with a particle size of greater than 4.75 mm (mainly the dried vegetables). The soup mix was reconstituted to a solid level of 11% using water that was 85° C. The soup was reconstituted using a mixing system typically found in a dispenser for this purpose with a standard type whipper (blade width 10 mm) was used at a whipper speed of 7800 rpm. The soup was mixed using a standard whipping chamber with a 11.2 mm diameter round discharge hole or a whipping chamber of the invention with an oval discharge hole with a width of 15.9 mm and length of 26.7 mm. The soup was reconstituted until the discharge hole of the mixing chamber clogged and overflowed.

| Whipper Type | Chamber Type | Number of servings until clogging |
|---|---|---|
| Standard width | Standard | 12 |
| | Oval type | No clogs after 50 servings |

While illustrative embodiments of the invention are disclosed herein, it will be appreciated that numerous modifications and other embodiments may be devised by those skilled in the art. For example, the number of inlets communicating to the mixing chamber can be more than one but encompasses any series of inlets suitable to feed one or more dehydrated components with one or more sources of diluents.

What is claimed is:

1. A mixing device particularly adapted for mixing and delivering a mixture of food product containing large particulates from dehydrated material and a diluent mixed together with the particulates, comprising:

a mixing chamber for receiving the dehydrated material and the diluent including a propeller, at least one inlet for the dehydrated material and diluent to enter the mixing chamber, and an outlet for allowing the mixture to exit the mixing chamber, wherein the propeller is arranged about a rotation axis to provide, upon rotation, a centrifugal force that creates a pumping action in the mixing chamber, and wherein the propeller defines a limit plane of rotation that substantially demarcates a suction part and a centrifugal part of the chamber, and wherein the outlet has a surface area and cross section with an axial dimension of at least 12.5 mm and is positioned in the mixing chamber relative to the propeller so that at least 50% of the outlet surface area is located in the centrifugal part in front of the limit plane of rotation of the propeller.

2. The mixing device according to claim 1, wherein at least 65% of the outlet surface area is located in the centrifugal part in front of the limit plane.

3. The mixing device according to claim 1, wherein at least 80% of the outlet surface area is located in the centrifugal part in front of the limit plane and wherein the dehydrated material contains at least 5 wt. % by weight of particulates of a size larger than 5 mm.

4. The mixing device according to claim 1, wherein the outlet has an elongated cross section with its longer dimension positioned substantially parallel to the limit plane of the propeller and in front of it.

5. The mixing device according to claim 4, wherein the outlet is positioned so that its is wholly placed in front of the limit plane of the propeller.

6. The mixing device according to claim 4, wherein the elongated cross section of the outlet is oriented with respect to the axis of rotation of the propeller at an angle of between zero to 90 degrees.

7. The mixing device according to claim 6, wherein the cross section of the outlet is oriented with respect to the axis of rotation of the propeller at an angle of about zero degrees and extends from the mixing chamber by a duct portion.

8. The mixing device according to claim 6, wherein the cross section of the outlet is oriented with respect to the axis of rotation of the propeller at an angle of about 90 degrees and extends from the mixing chamber by a duct portion that is curved and connects to a front wall of the mixing chamber.

9. The mixing device according to claim 8, wherein the duct portion connects to a substantially cylindrical wall of the mixing chamber with no substantial zone of restriction between the cylindrical wall of the mixing chamber and the peripheral wall of the duct portion.

10. The mixing device according to claim 9, wherein the mixing chamber comprises a front wall that is substantially flush with a front portion of the peripheral wall of the duct portion.

11. The mixing device according to claim 1, wherein the inlet is positioned substantially behind the limit plane of the propeller.

12. The mixing device according to claim 1, wherein the axial dimension of the outlet is at least equal to one-half the diameter defined by the circular path of the propeller.

13. The mixing device according to claim 1, wherein the transverse dimension of the outlet is at least equal to one-half the width of the propeller.

14. The mixing device according to claim 1, wherein the section of the outlet has an axial dimension of at least 15 mm, a transverse dimension of at least 10 mm and a ratio of axial dimension to transverse dimension of between about 1:1 to 3:1.

15. The mixing device according to claim 14, wherein the section of the outlet has an axial dimension of at least at least 18 mm, a transverse dimension of at least 13 mm and a ratio of axial dimension to transverse of between about 1.5:1 to 2.5:1.

16. The mixing device according to claim 1, which further includes means for collecting a metered amount of dehydrated material and a metered amount of the diluent.

17. A dispensing device comprising means for storing a supply of a dehydrated component, means for dosing the dehydrated component from the supply, means for providing a diluent from a diluent source, a serving area, and a mixing device according to claim 1.

18. A method for mixing and delivering a rehydrated mixture of dehydrated food material containing particulates and a diluent, which comprises:

providing dehydrated food material and a diluent in a mixing zone, providing a centrifugal mixing force to form a rehydrated mixture in the mixing zone, and delivering the rehydrated mixture through a dispensing outlet having a cross section that has an axial dimension of at least 12.5 mm by a pumping action created as a result of the centrifugal force exerted in the mixing zone so that the rehydrated mixture does not clog the mixing zone or the dispensing outlet.

19. The method according to claim 18, wherein the centrifugal mixing force is provided by a propeller having a rotational limit plane and wherein the outlet has an axial line that is placed in front of the rotational limit plane of the propeller to promote the pumping action.

20. The method of claim 18, wherein the dehydrated food material contains at least 5 wt. % by weight of particulates of a size larger than 5 mm.

* * * * *